Dec. 17, 1968  W. M. BOUSHKA  3,416,929
FOOD MATERIALS MIXING PROCESS
Filed Nov. 27, 1964  3 Sheets-Sheet 1

INVENTOR.
WILLIAM M. BOUSHKA
BY *Harold D. Jackson*
ATTORNEY

INVENTOR.
WILLIAM M. BOUSHKA
BY *Harold D. Jastrum*
ATTORNEY

INVENTOR.
WILLIAM M. BOUSHKA
BY Harold D. Jarstram
ATTORNEY

United States Patent Office 3,416,929
Patented Dec. 17, 1968

3,416,929
FOOD MATERIALS MIXING PROCESS
William M. Boushka, Minneapolis, Minn., assignor to General Mills, Inc., a corporation of Delaware
Filed Nov. 27, 1964, Ser. No. 414,132
11 Claims. (Cl. 99—17)

ABSTRACT OF THE DISCLOSURE

Mixing heterogeneous food materials by smear mixing and subsequently aging said materials to form a homogeneous mixture, followed by smear mixing the aged mixture.

---

Figure 1:
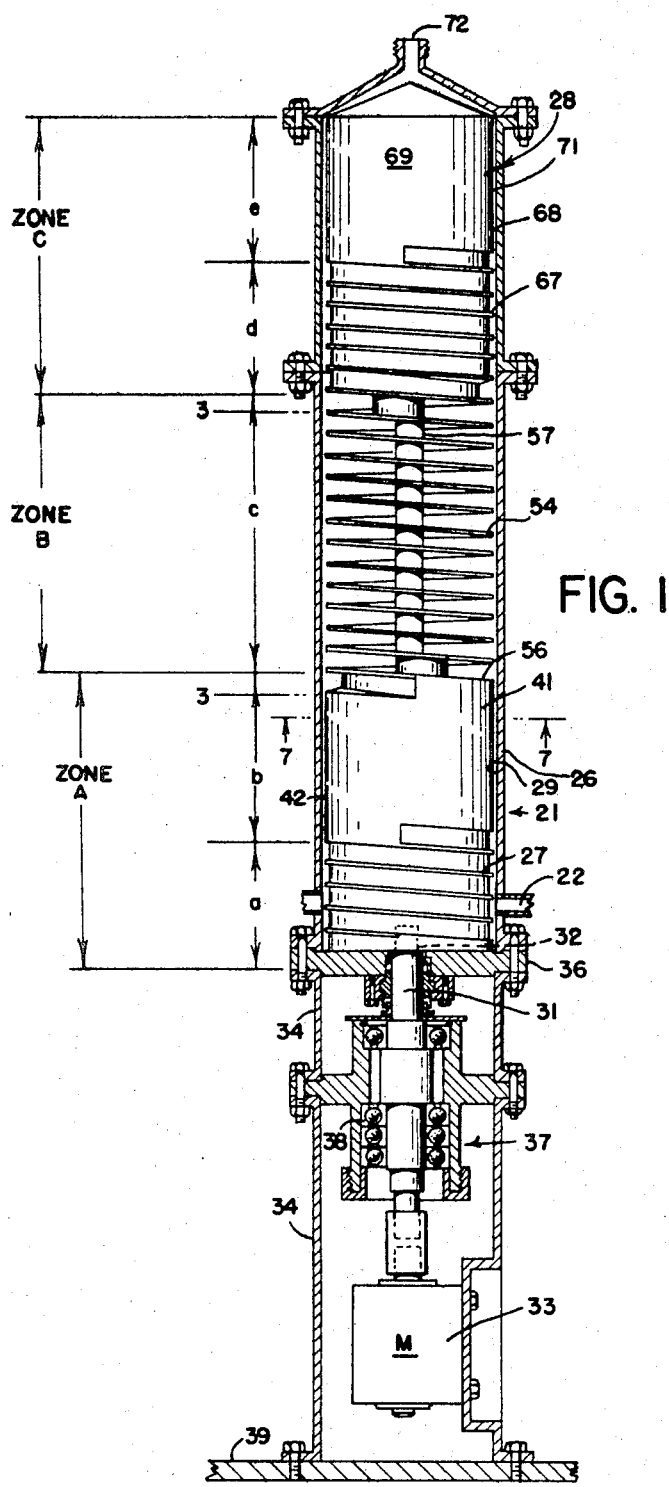

The present invention relates to a process for mixing food forming ingredients and more particularly to a process for producing a homogeneous food mixture from a heterogeneous mixture of food forming ingredients.

Many present-day convenience food products and processed foods are the result of extensive modification of natural food products such as, cereal grains, fruits, vegetables, meats, soybeans, corn and the like. A number of the modifications concern the combination of one or more of these natural food products to form a new convenience food product having novel and unusual taste and physical characteristics not always associated with the foods in their unprocessed state. Frequently, the individual characteristics of these natural food products or the modifications desired in the end product present problems when an attempt is made to combine these diverse types of natural food products to form a new product of uniform quality and characteristics.

An example of such a processed food is illustrated by the recent interest in production of meat substitutes from edible protein materials such as soybean, corn or peanut proteins, as well as from animal proteins, such as casein. One of the first steps in the production of such simulated meats is the preparation of filaments or fibers from the protein material. Groups of these filaments are impregnated with suitable binders, flavoring agents and the like to produce the simulated meats.

Certain of the available processes for preparing the proteins for conversion to fibers or filaments have not been entirely satisfactory. Conventional spinning solutions have been prepared through batch preparation techniques by dissolving a separated protein in aqueous alkali and then maturing the solution at a highly alkaline pH. This batch preparation of the spinning solution has several disadvantages. The primary disadvantage is the production of fibers or filaments which are not uniform in texture and physical makeup. Some of the fibers produced have very bad odor characteristics and flavors. This appears to be due to such things as changes and degradation of the protein material itself partially as a result of ineffective mixing techniques. Extreme conditions, notably temperature and high pH, accelerate the rate and possibly the ultimate degree of change. When caustic is added to a protein slurry in amount sufficient to yield a solution suitable for spinning (i.e., pH of 10.5 or higher) the viscosity of the mixture increases rapidly. Depending on conditions (i.e., rate of mixing, caustic level, temperature and solids content), the maximum viscosity is obtained in a few minutes. The viscosity then drops and this drop in viscosity measures the degradation of the protein due to the pH concentration. In the preparation of fibers from spinning solution prepared by a batch mixing method, the first fibers will be fairly acceptable but those prepared from the last portions of the solution often have an off odor and/or flavor due to the degradation of the protein material under the high pH conditions. This lack of uniformity in the fibers is particularly acute when large batches of the spinning solution are prepared by the batch method.

In addition to the lack of uniformity of the fibers, the batch preparation and mixing techniques often result in a loss of a substantial portion of the spinning solution. This is due to the degradation of the protein material and the accompanying change of viscosity of the spinning solution. Costly stabilizers are commonly used to prevent degradation of batch mixed proteins. On occasion, the whole spinning solution may have to be discarded, for example, where mechanical failure prevents the use thereof within the prescribed time period after preparation. Frequent cleaning and bleed-off at the start or termination of different batches also results in loss of material. It is also difficult, if not impossible, to achieve continuous filament production when the spinning solution or dope is prepared by batch preparation techniques. Batch preparation techniques require the preparation of several spinning solutions at predetermined time intervals in separate vessels with the use of such solutions alternately as the feed solution or dope. A considerable amount of expense is involved in supplying the needed equipment for batch techniques. Also, such a process would require critical control of viscosity of each of the spinning solutions and mechanical failure could result in a substantial loss of materials. Consequently, by such batch mixing techniques it is very difficult to prepare fibers having uniform properties suitable for the preparation of simulated meats.

Another example of processed foods requiring proper mixing techniques is the preparation of fruits and vegetables where the fruits and vegetables are reduced to a slurry and combined with flavoring agents, sweetening agents, coloring agents and similar ingredients. The quality of the end product is highly dependent upon the effectivenes of the mixing techniques wherein the additives are combined with the slurry of a fruit or vegetable. For example, some fruits are used to prepare a product which is very low in moisture content and which is intended for merchandising in unrefrigerated packages. Such finished products require precise control of the mixing of the fruit with the flavoring agents and preservatives in order to avoid degradation of the product when it is merchandised. If the fruit slurry is not combined with preservatives and like materials so that the result is a completely homogeneous mixture, then the fruit has a tendency to spoil or develop bad flavors, odors and appearance when it is subjected to elevated temperatures normally found in marketing places during the warm summer months. As with the preparation of simulated meats noted previously, the mixing can be accomplished by batch techniques. However, as noted batch mixing requires large quantities of apparatus and it results in products of varying quality from batch to batch.

It is therefore an object of the present invention to provide a new and improved process for the preparation of food products.

A further object of the present invention is to provide a new and improved process for continuously mixing food forming ingredients.

A further object of the present invention is to provide a new and improved process for continuously mixing food forming ingredients to convert a heterogeneous mixture of ingredients to a homogeneous mixture thereof.

It is a further object of the present invention to provide a new and improved process for the production of a homogeneous mixture of food forming ingredients containing protein by subjecting the ingredients to intensive mixing by continuous and simultaneous pressing, mixing, stretching and twisting.

Another object of the present invention is to prepare a homogeneous mixture of food forming ingredients by successively smear mixing and aging and then again smear mixing the ingredients.

Figure 3:
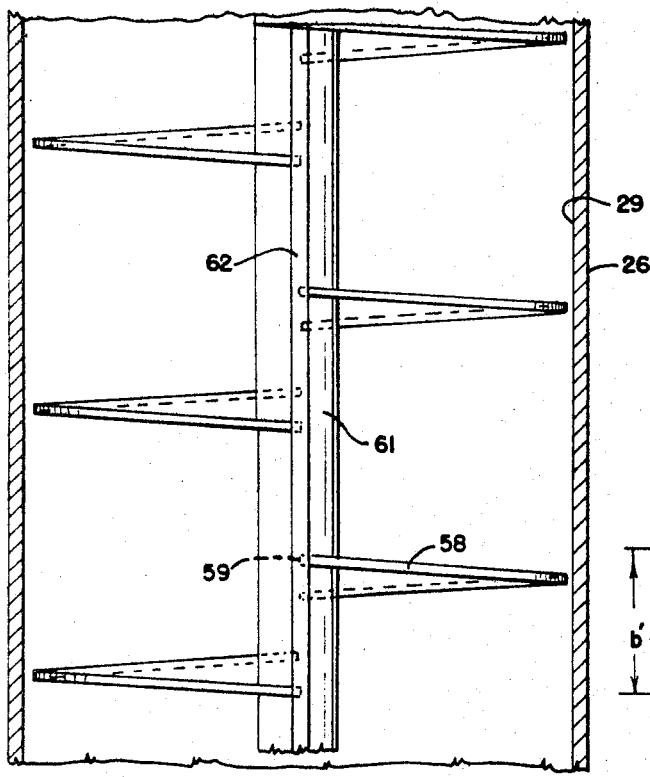
Figure 2:
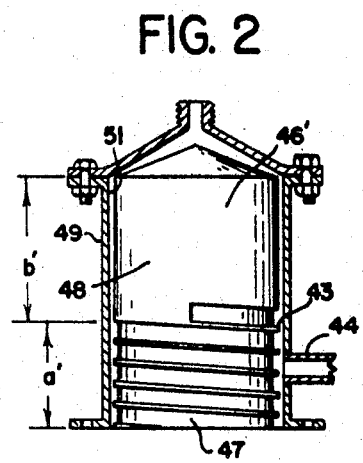
Figure 4:
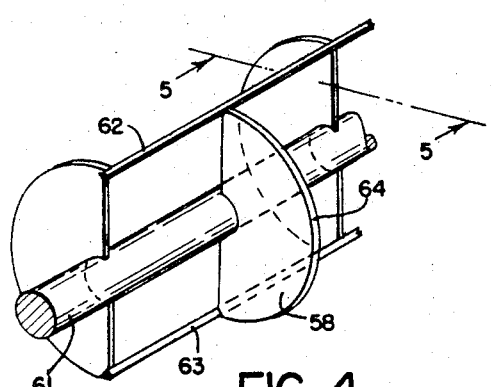
Figure 5:
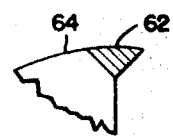
Figure 6:
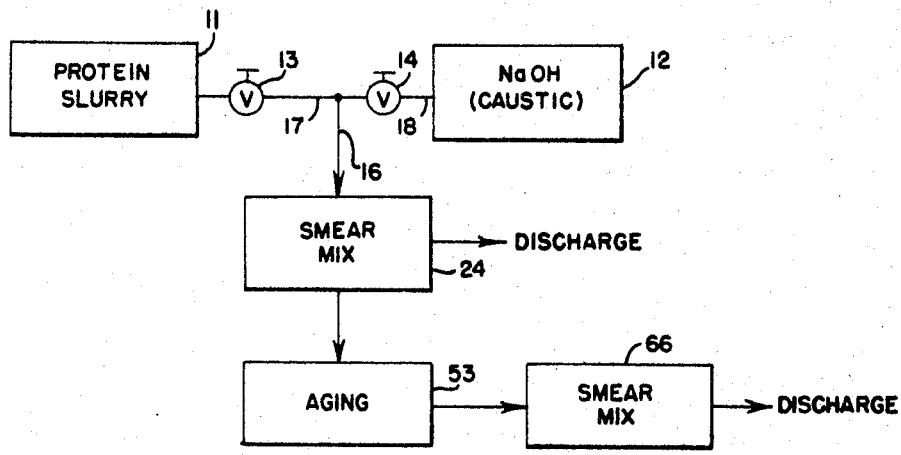
Figure 7:
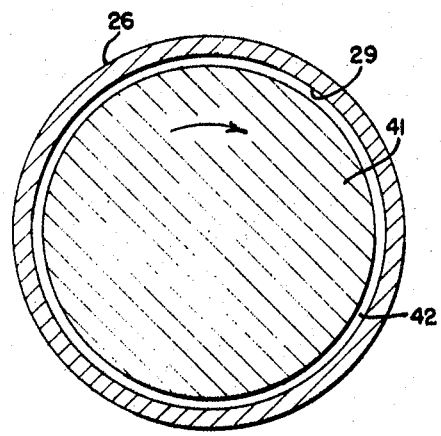

The above and further objects of the present invention will become apparent from a reading of the following description taken in conjunction with the accompanying drawings wherein, FIGURE 1 is a cross-sectional view of an apparatus for accomplishing the mixing of the food forming ingredients, FIGURE 2 is an alternate embodiment of FIGURE 1, FIGURE 3 is a fractional cross-sectional view taken generally between lines 3—3 of FIGURE 1 and is an alternate embodiment of the corresponding section in FIGURE 1, FIGURE 4 is a fractional isometric view of FIGURE 3, FIGURE 5 is a fractional cross-sectional view taken along lines 5—5 of FIGURE 4, and FIGURE 6 is a process schematic diagram, and FIGURE 7 is a cross-sectional view taken along lines 7—7 of FIGURE 1.

First a protein slurry is prepared from any one of a number of edible protein materials. Representative of such materials are soybean, safflower, corn, peanut and pea proteins as well as various animal proteins such as casein. Generally, the proteins are used in the relatively pure form. Thus, for example, soybeans may be dehulled and solvent extracted, preferably with hexane to remove the oil therefrom. The resulting substantially oil-free soybean flakes or meal is then suspended in water and sufficient alkali or other alkaline substance is added to dissolve the protein and leave undissolved carbohydrates and certain other materials in the meal. After separation of the extract, the protein is precipitated by the addition of an acidic substance, such as acetic acid, sulphur dioxide and the like. Especially good results are obtained when the acidifying substance is sulphur dioxide since the resulting precipitate provides an aqueous protein slurry of improved properties, i.e., more homogeneous. The precipitate is then conventionally collected by filtration or centrifugation, water washed and dried. The dried protein isolate is used to prepare the aqueous protein slurry which serves as a starting material for preparing spinning solutions which is ultimately used to prepare the fibrous protein food product. The precipitate after separation and water washing, can be diluted with water to provide the aqueous protein slurry. Thus, the flakes can be extracted with aqueous alkali, the extract separated from the flakes, the protein precipitated from the extract, the precipitated protein collected and diluted with water to provide the protein slurry, the protein slurry used to prepare the spinning dope or solution and the solution extruded to provide the shaped protein products in one continuous operation.

The solids content of the aqueous protein slurry will vary considerably depending upon the particular protein used. Generally the solids content will be in the range of about 10 to about 35% by weight. Preferably the solids content of soybean protein in the slurry will be from about 15% to about 30% by weight.

To prepare the spinning dope or solution, the alkaline substance is preferably sodium hydroxide, although any alkaline substance compatible with the solution and end use of the products and which is also capable of raising the pH of the solution to the required extent may be used. Dilute aqueous solutions containing about 10 to about 20% by weight of the alkaline substance are preferred.

As noted, it has been found that the quality of the final fibrous protein product is to a large extent dependent on the effectiveness of the mixing of the protein slurry with the caustic which is utilized to increase the viscosity of the aqueous protein slurry. Improperly mixed materials tend to produce a product which is granular in texture and the resulting fibers demonstrate other undesirable characteristics. After the aqueous protein slurry is prepared, it is stored in a suitable reservoir which is capable of supplying a large quantity of the protein slurry to a continuous processing system. The storage of the aqueous protein slurry is illustrated in FIGURE 6 of the drawings by block 11. A similar quantity of caustic such as sodium hydroxide is also stored (see block 12 of the schematic diagram in FIGURE 6) so that the caustic is constantly available for continuous combining with the protein slurry.

Valves 13 and 14 are utilized to control the amount of protein slurry and sodium hydroxide which is supplied to a common supply line or conduit 16 (or other conveying means) where the protein slurry is combined with the sodium hydroxide to form a heterogeneous mixture of the two ingredients. Supply lines 17 and 18 represent separate conduits for supplying the protein slurry and sodium hydroxide respectively and may join a common conduit 16. However, the protein slurry and sodium hydroxide may also be combined within a mixer illustrated in FIGURE 1 of the drawing. In such a situation line 16 could be connected to connection 19 of the mixing apparatus 21 and line 18 could be connected to the connection 22 of the mixer 21. In other words, the protein slurry and caustic may be combined in a number of ways as long as a heterogeneous mixture is produced with the proper quantity of protein slurry combined with the proper quantity of sodium hydroxide on a continuous basis. In the case where soy protein slurry is being utilized in combination with sodium hydroxide, a concentration of about 13.37 to about 15.84% by weight of soy protein solids with about .79 to about 2.23% of sodium hydroxide solids in about 83.37 to about 84.40% of water will produce a finished product having satisfactory characteristics. A preferred product can be produced with a mixture of about 15.32% soy protein solids and about 1.09% sodium hydroxide solids in about 83.59% water. Valves 13 and 14 are utilized to control the flow of the slurry and the caustic from the reservoirs illustrated by blocks 11 and 12 respectively in order to provide the proper ratio of the ingredients.

Next the heterogeneous mixture of the food forming ingredients (protein slurry and sodium hydroxide in this case) is intensely mixed.

The heterogeneous mixture is intensively mixed by smear mixing the heterogeneous mixture to produce a homogeneous mixture of the food forming ingredients. This smear mixing step is illustrated by block 24 of FIGURE 6. Smear mixing, as referred to in this specification and the claims, means intensive mixing of a heterogeneous mixture wherein there is continuous and simultaneous pressing, mixing, stretching and twisting forces applied to the heterogeneous mixture in order to produce a homogeneous mixture of the food forming ingredients. This smear mixing step may be carried out by forming a thin film of the heterogeneous mixture and thoroughly and intensively agitating this thin film to accomplish the continuous and simultaneous pressing, mixing, stretching and twisting of the heterogeneous mixture to produce the desired homogeneous mixture. As an example of a means for accomplishing this smear mixing, a quantity of the heterogeneous material could be placed upon a relatively smooth, flat surface and a second smooth surface would then be forced against the heterogeneous material thus rolling the heterogeneous material out and forming a thin film thereof. The two smooth surfaces would then be moved relative to one another to produce the smear mixing described hereinabove.

A preferred and more satisfactory means for accomplishing this smear mixing is illustrated in FIGURES 1 and 2 of the drawings. In FIGURE 1, the heterogeneous mixture of the food ingredients is produced by introducing one of the food ingredients through connection 19 and a second of the ingredients through a connection 22 in the barrel 26 of the mixing apparatus 21. The heterogeneous mixture is formed in section a of the apparatus where flights 27 produce a mixing of the individual ingredients.

The mixing apparatus generally designated by the numeral 28 is divided in one embodiment of the invention into three zones A, B, and C which in turn are composed of sections *a* through *d*. This mixing apparatus 28 is mounted within the bore 29 of barrel 26. The mixer 28 is connected to a drive shaft 31 which is connected by threads 32 to the mixer 28. A motor 33 is provided for driving, in this case rotating, the mixer 28 to accomplish the mixing action within the mixing apparatus 21. The mixer 28 is shown in the embodiment in FIGURE 1 mounted in a vertical position with the barrel 28 connected to a housing 34. Wall 36 separates the mounting and drive means 37 from the mixer 28 and bore 29 of the barrel 26. Thus ingredients which are introduced into the section *a* of the mixer 28 will not pass into the mounting and drive means 37 of the apparatus. The mounting and drive means 37 consists of a simple shaft and bearing arrangement wherein bearings 38 provide a means for rotatively mounting the shaft and the mixer 28 for high speed rotation. The housing 34 of the apparatus is mounted on a floor 39 or on some other suitable foundation.

Flights 27 of section *a* are designed to produce some mixing of the heterogeneous material but are also specifically designed to pump or apply pressure to the heterogeneous material so that the material can be forced through a confined passage. The heterogeneous material is forced from section *a* containing the flights 27 into section *b* which is a smear mixing section. The smear mixing section is a smooth cylinder 41 which sits within the cylindrical bore 29 of the barrel 26. The space 42 between the outer surface of the cylinder 41 and the bore 29 forms a passage 42 which is designed to produce the smear mixing of the heterogeneous mixture in order to produce a homogeneous mixture thereof. The passage 42 is essentially a cylindrical passage defined by the cylinder 41 and the bore 29. The passage 42 is restricted sufficiently so that when the heterogeneous mixture is forced into passage 42, it is subjected to continuous and simultaneous pressing, mixing, stretching, and twisting forces. Since the barrel 26 is stationary and the motor 33 rotates the mixer 28 and consequently, the outside surface of the cylinder 41, the outside surface of the cylinder 41 moves relative to the bore 29. In this particular apparatus the relative movement is such that the outside surface of the cylinder 41 moves perpendicular to the movement of the heterogeneous mixture through the passage 42. In other words, the heterogeneous mixture moves vertically upward in the illustrated apparatus of FIGURE 1 whereas the surface of cylinder 41 moves perpendicular thereto in the arrow direction (see FIGURE 7). A thin film of the heterogeneous mixture is formed in the passage 42. The thickness of the film is determined by the clearance between the surface of cylinder 41 and the bore diameter of the bore 29. The thickness of the film will be governed by a number of factors. These factors include the viscosity of the heterogeneous mixture, the concentration of the solid material in the heterogeneous mixture, the nature of the solids in the heterogeneous mixture, the speed of rotation of the mixer 28 and similar factors. As the diameter of the cylinder 41 is made greater, the peripheral speed of the rotating cylinder 41 will increase consequently increasing the mixing, stretching and twisting forces applied to the heterogeneous mixture as it passes through the passage 42. Further, the length of the cylinder 41 and consequently the length of the passage 42 may be varied by lengthening the cylinder 41. Again the exact length utilized will be to a great extent determined by the quality of the material desired, the difficulty with which the particular materials mix and the like. The essential feature is that a homogeneous mixture is produced as the heterogeneous mixture passes from section *a* through the passage 42 to zone B of the mixing apparatus 21.

In the illustrated case, wherein a soy protein is mixed with sodium hydroxide, the heterogeneous mixture is essentially a liquid material and consequently the passage 42 may be relatively narrow in order to achieve the mixing forces for generating a homogeneous mixture. It has been found that in such a case a film thickness of about .055 in. produces a satisfactorily homogenized mixture when the mixer having a bore diameter of 8 inches is operated at about 135 r.p.m.

After the food ingredients have passed through zone A (see FIGURE 1) the smear mixed material which is now a homogeneous mixture of food ingredients may now be discharged from further processing. Reference to FIGURE 6 of the drawings will illustrate this step wherein the material is discharged after the smear mixing illustrated by block 24 of FIGURE 6 has been completed. If the homogeneous mixture is to be discharged after a single smear mixing step, then an apparatus illustrated in FIGURE 2 may be utilized to complete the processing of the food ingredients. The apparatus illustrated in FIGURE 2 is an alternate embodiment of that of FIGURE 1 which does not include zones B and C of the FIGURE 1 apparatus. The apparatus in FIGURE 2 contains only two sections, section *a'* and section *b'* which correspond to sections *a* and *b* respectively of FIGURE 1 of the drawings. A heterogeneous mixture of food ingredients may be introduced into the flights 43 through an opening 44. Section *a'* works exactly the same as section *a* of FIGURE 1. The mixer 46 is connected to a drive system 37 in the same manner that the mixer 28 is connected to the drive system 37. Specifically, the drive shaft is connected to the mixer 46 by a thread assembly which is inserted at threaded opening 47. The cylindrical section 48 of the mixer is the smear mixing section and functions the same as the smear mixing section or cylinder 41 illustrated in FIGURE 1. The smear mixing section 48 which is a smooth cylindrical section fits within a barrel 49 and forms a passage 51 between the bore of the barrel 49 and the cylindrical surface of the smear mixing section 48. After the material has been homogenized in the smear mixing section 48 it is discharged from the apparatus in FIGURE 2 through an opening 52.

Frequently, after a mixture of food ingredients has been mixed to a homogeneous mixture, the mixture will require a period of time for aging. During this aging period, depending upon the food ingredients involved, a number of things may take place. For instance, in the case of a soy protein slurry which has been homogeneously mixed with sodium hydroxide a period time is often necessary in order to permit the sodium hydroxide to completely react with the soy protein slurry. During this reaction time, or aging, the protein molecules of the soy protein chemically "uncoil" as a result of reaction with the sodium hydroxide. In the situation where a solid material is mixed with a liquid, a period time may be necessary to permit many of the solids in the homogeneous mixture to be dissolved in the liquid which is a part of the homogeneous mixture. The homogeneous mixture is permitted to age and dissolve the solids to the extent desired so that an end product of predetermined qualities may be produced. Consequently, in a preferred form of a process, the homogeneously mixed ingredients resulting from the smear mixing step 24 are permitted to age as illustrated by block 53 in FIGURE 6. This aging step may be accompanied by slight agitation of the homogeneous mixture in order to accelerate the reaction of the homogeneously mixed materials or ingredients. The aging period should be carried out for a sufficiently long period of time to permit the material to acquire the desired characteristics. Preferably, the aging period of the soy protein slurry and sodium hydroxide is about 1 minute to about 4.5 minutes. This aging period can be extended to the point where the protein begins to degrade as a result of the action of the sodium hydroxide. The caustic concentration in the homogeneous mixture significantly influences the degradation of the protein. Higher caustic levels cause rapid degradation of the protein.

This aging process may be carried out in a simple container designed to hold the homogeneous mixture a period of time to complete the aging step or it may be completed in a continuous process apparatus such as FIGURE 1 by providing a zone B within the barrel 26 which acts as a container for carrying out the aging step. In FIGURE 1 of the drawings, the mixer 28 contains the aging section zone B where a number of flights 54 are positioned within the bore 29 of the barrel 26. These flights 54 are of uniform pitch and flight depth. The flights are connected through the discharge end 56 of the smear mixing cylinder 41 and are designed to convey the homogeneous mixture discharged from section b to a subsequent processing step. The homogeneous mixture is not only conveyed by the flights 54 but a slight amount of agitation also takes place along with the conveyance of the material. The pitch of the flights 54 may be varied in order to vary the hold time or aging period in the zone B. Also, zone B may be made of any desired length depending upon the aging period which is desired for particular products. The core 57 of the flights 54 may be a permanent part of the mixer 28 or the entire flight section may be removable and attached to the smear mixing section 41 by suitable threads attached to an extension of the core 57 which would fit into a threaded socket in the smear mixing cylinder 41.

An alternate embodiment of the apparatus illustrated in the aging zone B in FIGURE 1 is shown in FIGURES 3, 4, and 5 of the drawings. In this embodiment, the flights 54 of FIGURE 1 are eliminated to a great extent so that only paddles 58 remain. These paddles are actually half flights. The paddles 58 are spaced a substantial distance apart but each paddle contains enough pitch in order to move the homogeneous mixture through the aging zone B to the next succeeding zone. The paddles 58 are each a half flight in the sense that the paddle starts at point 59 and terminates at a position 180° about the shaft 61. The paddles are designed to not only advance the homogeneous mixture but also to provide a certain amount of agitation of the material in order to aid the aging process.

Reference to FIGURE 4 of the drawings which is an isometric view shows the paddles 58 as they are connected to shaft 61. Each of the paddles 58 is also connected by scrapers 62 and 63. These scrapers are designed to move with the paddles 58 very closely to the bore 29 of barrel 26 to remove any material which tends to cling or build-up on the bore 29. The scrapers 62 and 63 are attached to each of the blades or paddles 58 as illustrated in the fractional cross section view of FIGURE 5. A preferred form of the scraper 62 and 63 is a scraper having a triangular cross section. The outer surface closest to the bore 29 may coincide with the outer surface 64 of the paddles 58.

Very often the completion or continuation of the reaction between the individual food forming ingredients during the aging step results in a formation in a mass of material having areas of varying viscosities. In other words, in the case of the homogeneous mixture of a soy protein slurry and a sodium hydroxide, the aging step tends to produce a livering effect in the homogeneous material. This livering effect can best be described as a formation of jelly like masses in the material where the jellied masses have a higher viscosity than that desired for the product at this point in the process. The resulting livered material may be difficult if not impossible to handle and may cause some problems of conveyance or formation of the material into fibers. Further, in the case of materials which require time for complete dissolving, the dissolving process may result in formation of new compounds which in turn may have a gritty texture or the like. Consequently, it is often desirable to have a further mixing step as illustrated by block 66 in the block diagram of FIGURE 6. The aged mixture is next smear mixed in exactly the same manner that the heterogeneous mixture was smear mixed in the step illustrated by block 24 in the block diagram. The same conditions necessary for smear mixing as previously described are utilized for this subsequent smear mixing of the aged material. The same thin film of the aged material must be obtained and vigorously worked to again bring the aged material to the desired viscosity and consistency. The previously noted means for accomplishing smear mixing may again be used but the apparatus illustrated in FIGURE 1 of the drawings is a preferred embodiment of a means for carrying out this second smear mixing step.

The aged material is advanced from the zone B and into section d of the second smear mixing zone C. In section d the aged mixture is again mixed to a slight extent by the flights 67 of the section d. Also, the flights of section d apply pressure to the aged material to force it through a passage 68. Passage 68 is formed between the bore 29 of barrel 26 and the smooth surfaced cylinder 69 of the smear mixing section e. In smear mixing section e the aged material is again subjected to the continuous and simultaneous pressing, mixing, stretching and twisting forces characterized by the mixing in section b of the apparatus. The resulting mixing of the aged material produces a homogeneous material of uniform viscosity which does not have the jellied masses, granular texture or similar characteristics of the aged material. The extent of the smear mixing in section e of the apparatus again is determined by the nature of the material being treated, that is whether the aged material contains a large quantity of granular material, whether it has a high viscosity or the like. In any event, the aged material should be subjected to sufficient smear mixing in section e in order to provide a uniform viscosity of a homogeneous mixture. After this second smear mixing step, the material is then discharged through the discharge opening 72 to a subsequent processing step.

It is to be clearly understood that the above described preferred and novel apparatus and the material used to illustrate the novel method are merely illustrative of applicant's invention and are not intended to limit the scope of the invention. Many variations of the novel method and novel apparatus may be devised by those skilled in the art which fall within the scope of applicant's invention. For example, the method and apparatus may be utilized in connection with a number of different food ingredients such as listed earlier. Some of these include fruit, cereal grains, and the like. A number of liquids of various viscosities may be mixed with a variety of granular material. Further, the aging step may encompass processes not understood by the inventor but which step is required to permit the homogeneously mixed materials to react with one another before further processing can or should take place on the material. These are illustrations of variations which are contemplated to be within the scope of this invention.

Now therefore I claim:

1. A process for continuously mixing food forming ingredients to form a homogeneous mixture which comprises the steps of forming a heterogeneous mixture of the food forming ingredients, smear mixing the heterogeneous mixture to form a homogeneous mixture of the food forming ingredients, aging said homogeneous mixture for a period of time sufficient to permit said mixture to acquire the desired characteristics, and then smear mixing the aged mixture.

2. A process for continuously mixing food forming ingredients to form a homogeneous mixture which comprises the steps of forming a heterogeneous mixture of the food forming ingredients; forcing the heterogeneous mixture to pass between two relatively moving surfaces which form a thin film of the heterogeneous mixture and which subject the heterogeneous mixture to continuous and simultaneous pressing, mixing, stretching and twisting forces to convert said heterogeneous mixture to a homogeneous mixture; aging said homogeneous mixture for a period of time sufficient to permit said mixture to acquire the desired characteristics and then forcing the aged mixture to pass between two relatively moving surfaces to further homogenize said aged mixture.

3. A process in accordance with claim 2 in which the thin films formed between the relatively moving surfaces has a substantially uniform cross-sectional thickness throughout the entire film.

4. A process in accordance with claim 2 which further includes agitating the homogeneous mixture during the aging thereof.

5. A process in accordance with claim 2 in which the heterogeneous and aged mixtures are forced between the respective relatively moving surfaces in a first direction and the direction of relative movement between said moving surfaces is perpendicular to said first direction.

6. A process for continuously mixing food forming ingredients to form a homogeneous mixture which comprises the steps of forming a heterogeneous mixture of an aqueous protein slurry and an aqueous solution of an alkaline material, smear mixing the heterogeneous mixture to form a homogeneous mixture of the protein and alkaline material, aging the homogeneous mixture for a period of time sufficient to permit said mixture to acquire the desired characteristics, and then smear mixing the aged mixture.

7. A process in accordance with claim 6 in which the protein is soy protein.

8. A process in accordance with claim 7 in which the alkaline material is sodium hydroxide.

9. A process in accordance with claim 7 wherein the homogeneous mixture is aged for about 1 to about 4.5 minutes.

10. A process in accordance with claim 7 in which the heterogeneous mixture contains about 13.37 to about 15.84% protein solids, about 83.37 to about 84.40% water and about .79 to about 2.23% sodium hydroxide solids.

11. A process in accordance with claim 7 in which the heterogeneous mixture contains about 15.32% soy protein solids, about 83.59% water and about 1.09% sodium hydroxide solids.

References Cited

UNITED STATES PATENTS

| 3,117,006 | 1/1964 | Wenger | 99—80 |
| 3,134,683 | 5/1964 | Holahan et al. | 99—80 XR |

OTHER REFERENCES

Perry's Chemical Engineers Handbook, McGraw-Hill Book Company, Inc., New York, 1963, pp. 19-33 to 19-35.

RAYMOND N. JONES, *Primary Examiner.*

H. H. KLARE, III, *Assistant Examiner.*

U.S. Cl. X.R.

99—20, 80, 100, 1, 234